Jan. 16, 1934.  C. F. PYM  1,943,344
MACHINE FOR USE IN THE MANUFACTURE OF SHOES
Filed Aug. 4, 1931  7 Sheets-Sheet 2

INVENTOR
Charles F. Pym
By his Attorney
Harlow M. Davis

Jan. 16, 1934.  C. F. PYM  1,943,344
MACHINE FOR USE IN THE MANUFACTURE OF SHOES
Filed Aug. 4, 1931  7 Sheets-Sheet 3

Jan. 16, 1934.   C. F. PYM   1,943,344
MACHINE FOR USE IN THE MANUFACTURE OF SHOES
Filed Aug. 4, 1931   7 Sheets-Sheet 4

INVENTOR
Charles F. Pym
By his Attorney
Harlow B. Davis

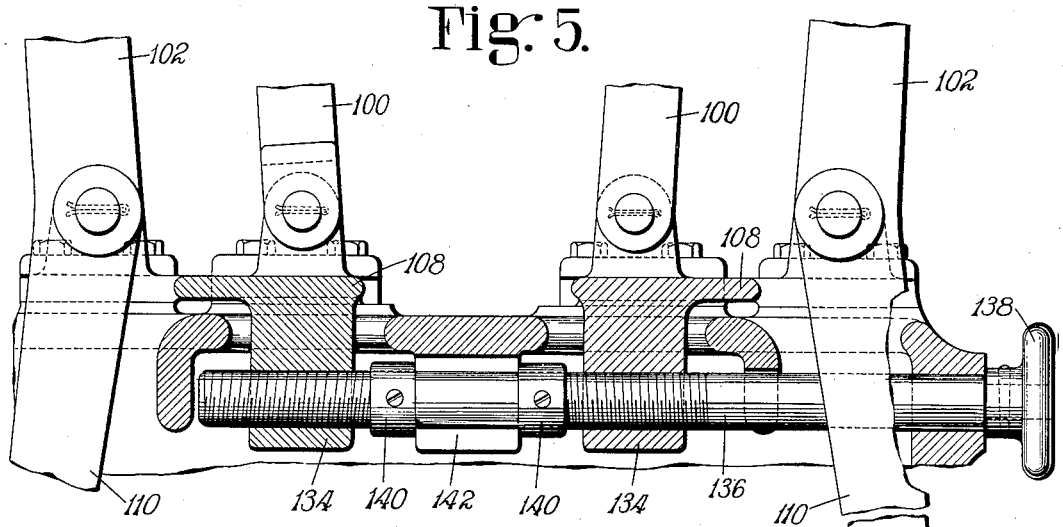
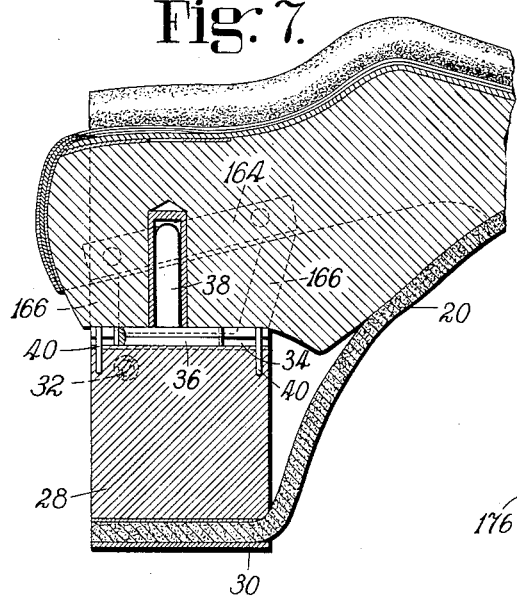
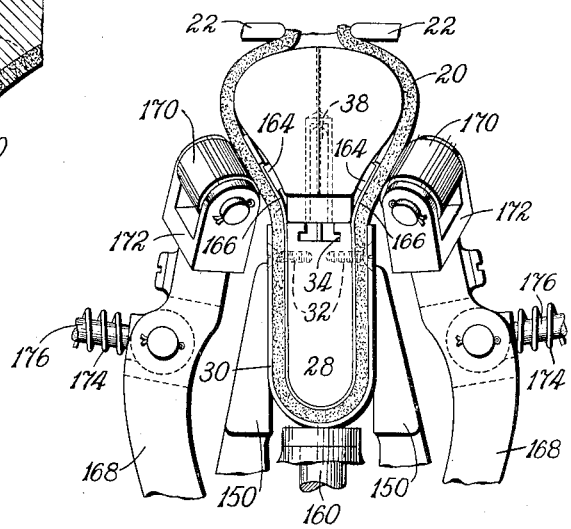
Fig. 5.
Fig. 7.
Fig. 6.

Jan. 16, 1934.    C. F. PYM    1,943,344
MACHINE FOR USE IN THE MANUFACTURE OF SHOES
Filed Aug. 4, 1931    7 Sheets—Sheet 6

INVENTOR
Charles F. Pym
By his Attorney,
Harlow M. Davis

Jan. 16, 1934.     C. F. PYM     1,943,344
MACHINE FOR USE IN THE MANUFACTURE OF SHOES
Filed Aug. 4, 1931     7 Sheets-Sheet 7

Patented Jan. 16, 1934

1,943,344

UNITED STATES PATENT OFFICE 1,943,344

MACHINE FOR USE IN THE MANUFACTURE OF SHOES

Charles F. Pym, Beverly, Mass., assignor to United Shoe Machinery Corporation, Paterson, N. J., a corporation of New Jersey Application August 4, 1931. Serial No. 555,035

120 Claims. (Cl. 12—7)

This invention relates to machines for use in the manufacture of shoes, and more particularly to machines having means for shaping shoe upper materials over lasts. In one aspect, the invention has in view the provision of an improved machine for lasting the opposite sides of shoes between their toe and heel-end portions, and more especially for operating on shoes in the manufacture of which the upper materials at the opposite sides are secured in lasted position by cement. It is to be understood, however, that the invention is not limited to means for operating on shoes in those particular locations, nor limited to the use of cement as upper-fastening means.

For the accomplishment of the objects in view, the invention provides a novel organization of means for shaping uppers over lasts by the use of a flexible lasting device, herein shown as a rubber apron, which by engagement with the upper, as illustrated from its toe-end portion to its heel-end portion, draws it tightly about the last and presses it into conformity to the contour of the last. Combined with the flexible apron in the construction shown are overlaying devices or members which extend continuously along the opposite sides of the last and are curved both widthwise and heightwise of the last in substantial conformity to the curvature of the opposite side edges of an insole on the last, these devices being arranged to act through the apron to lay the marginal portion of the upper inwardly into lasted position over the bottom face of the insole. As illustrated, the construction is such that the last with the upper and insole thereon is supported by the flexible apron when presented to the machine by the operator and is depressed within the apron by a shoe rest or presser engaging the bottom face of the insole. The machine herein shown is a power-operated machine in which the various parts are operated in an automatically determined cycle, but it is to be understood that the invention in various novel aspects is not limited to a power machine.

In a further aspect, with special reference to the manufacture of shoes in which the uppers are fastened in lasted position by cement, the invention provides novel means for drawing the upper tightly about the last and pressing it close to the sides of the last with its lasting margin projecting beyond the bottom of the last or the edge of the insole, and for then maintaining it in that position to permit cement to be applied to the lasting margin of the upper materials the width of which is thus accurately determined by the machine. Insurance is thus afforded that the cement will be applied only where needed, and not on any portions of the upper materials that are to extend upwardly from the edge of the insole in the finished shoe. The power-operated machine herein shown is so controlled that it comes automatically to a stop with the upper positioned as described to receive the cement, and to facilitate the application of the cement to the upper the shoe rest or presser is at that time withdrawn from engagement with the insole.

It is contemplated that in the use of the illustrated machine in lasting shoes with comparatively quick-setting cement the machine will maintain the marginal portion of the upper pressed upon the insole long enough to permit the cement substantially to set, after which the shoe will be released from the lasting means and removed from the machine. Alternatively, as further illustrated, in the use of cement of a different character, the overlaying means may be moved inwardly over the insole only far enough to leave a portion of the margin of the upper exposed to receive temporary fastenings driven by the operator to assist in holding the upper after the shoe has been removed from the machine. If it is not desired to use such fastenings to assist in holding the upper during the setting of the cement, the invention further provides for removal of the lasting means from the machine with the shoe while holding the upper in lasted position. For this purpose the flexible apron and the overlaying members of the illustrated machine are so mounted as to be readily detachable from the machine, and mechanism also removable with the shoe is provided for maintaining these parts in upper-holding positions on the shoe. In operating in this manner different sets of parts, each including a flexible apron and its associated overlaying members, will be used in lasting different shoes. In still another aspect, the invention thus provides novel means portable with a shoe for holding the upper in lasted position.

To assist in controlling the last and shoe and in positioning them in proper relation to the members that lay the marginal portion of the upper over the insole, the machine is further provided with novel means for supporting the heel-end portion of the last. As illustrated, this means comprises a member fastened to the flexible apron and arranged to serve as a support for the top of the heel end of the last, this member carrying a spindle arranged to project into the spindle hole of the last and movable in directions lengthwise of the last to permit lasts and shoes of different sizes to be readily positioned in proper relation to the lasting means. Below this member and the apron, in the construction shown, is a plunger which is yieldable in response to depression of the last and assists at the proper time in the operation of the machine in pressing the bottom of the shoe up against the apron and the overlaying members. To assist further in preventing lateral tipping of the last, there is provided mechanism for clamping the above-mentioned supporting member at its opposite sides, this mechanism, as illustrated, being carried by the yieldable plunger.

In order to prevent any possibility of distortion of the heel-end portion of the upper by the working of the upper heightwise of the last forwardly of its heel end, the machine is further provided with novel means for clamping the heel end of the upper against the last. As illustrated, this means comprises resilient clamping devices positioned between the apron and the sides of the heel end of the upper, and mechanism arranged to act through the apron to press these devices against the upper.

Still other features of the invention are to be recognized in novel means for operating the overlaying members, including an arrangement of parallel links for maintaining these members in proper relation to the shoe, and a novel arrangement of mechanism whereby these members are permitted to adjust themselves to the shoe in their operative movements.

The above and other features of the invention, including various novel details of construction and combinations of parts, will now be more particularly described by reference to the accompanying drawings and thereafter pointed out in the claims.

In the drawings,

Fig. 5 is a view on an enlarged scale, with parts in section, showing portions of the mechanisms for operating and adjusting the overlaying members;

Fig. 6 is a view on an enlarged scale showing a portion of the lasting and upper-clamping mechanisms, with the parts in the same positions as in Fig. 4;

Fig. 7 is a vertical section through a portion of a last and shoe and parts associated therewith, showing more clearly the means for supporting and controlling the heel end of the last;

Figure 1:
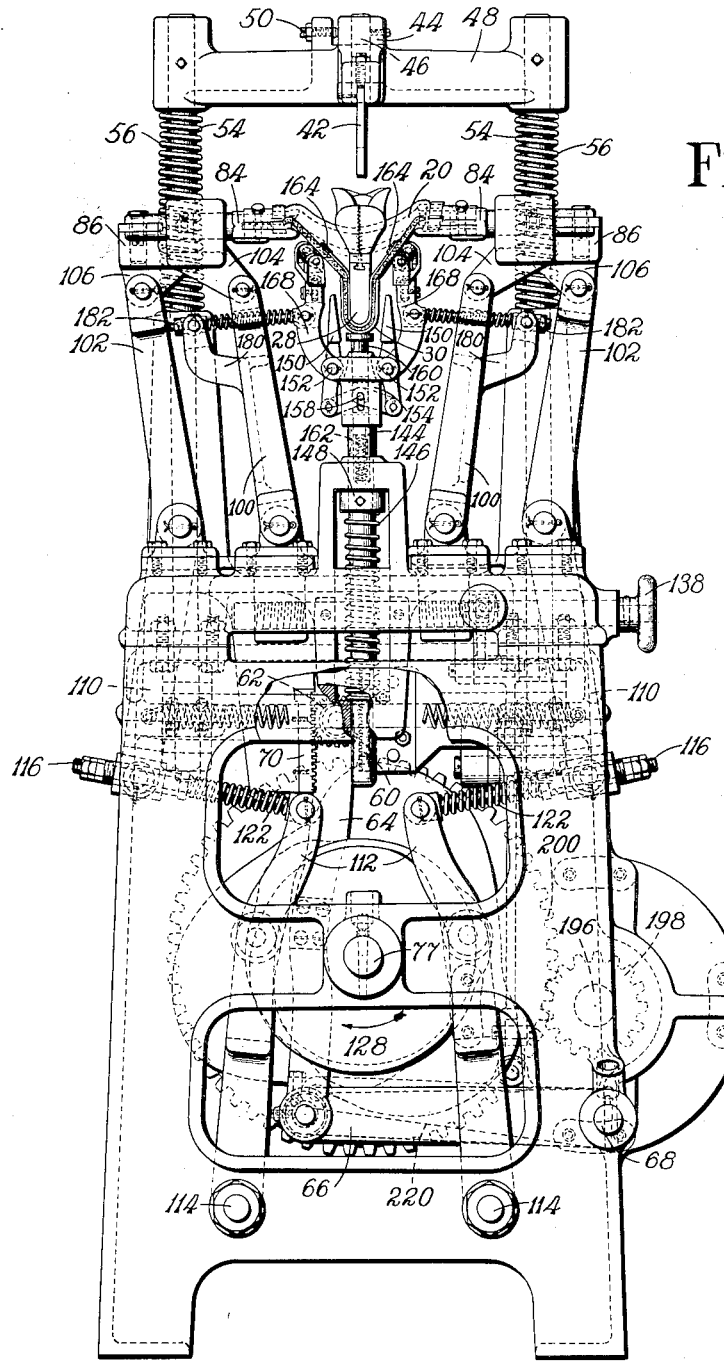
Fig. 1 is a view in front elevation of a machine in which the invention is embodied.

For lasting the opposite sides of shoes the machine herein shown is provided with a flexible elastic apron 20 preferably consisting of a sheet of vulcanized rubber formed and arranged to present initially more or less of a hollow in which to receive and support a last presented bottom upward with an upper and an insole thereon. The apron is thus arranged to extend across the top face of the upper and last beneath the same, and as illustrated is of such length as to extend from the toe-end portion to the heel-end portion of the upper and to overlap more or less these different end portions which preferably, although not necessarily, will have been lasted before the shoe is presented to the machine. The apron is suspended in position to receive the shoe on overlaying devices comprising plates 22 operated as hereinafter described to lay the marginal portion of the upper inwardly over the insole, the apron being fastened to these plates by clamps 24 and screws 26. To assist in supporting the last and shoe within the apron there is fastened to the apron a block 28 of rigid material, preferably light metal such as aluminum, arranged to underlie and serve as a support for the top of the heel end of the last. This block and the apron are fastened together by a U-shaped metal clamp 30 and screws 32 (Figs. 6 and 7). The block 28 is provided with a guideway 34 in which is mounted a slide 36 having fast thereon a spindle 38 arranged to project into the spindle hole of the last. The slide 36 and the spindle 38 are thus freely movable in directions lengthwise of the last to permit lasts and shoes of different sizes to be readily positioned in proper relation to the lasting means, the movements of these parts in opposite directions being limited by pins 40 in the block 28.

Figure 2:
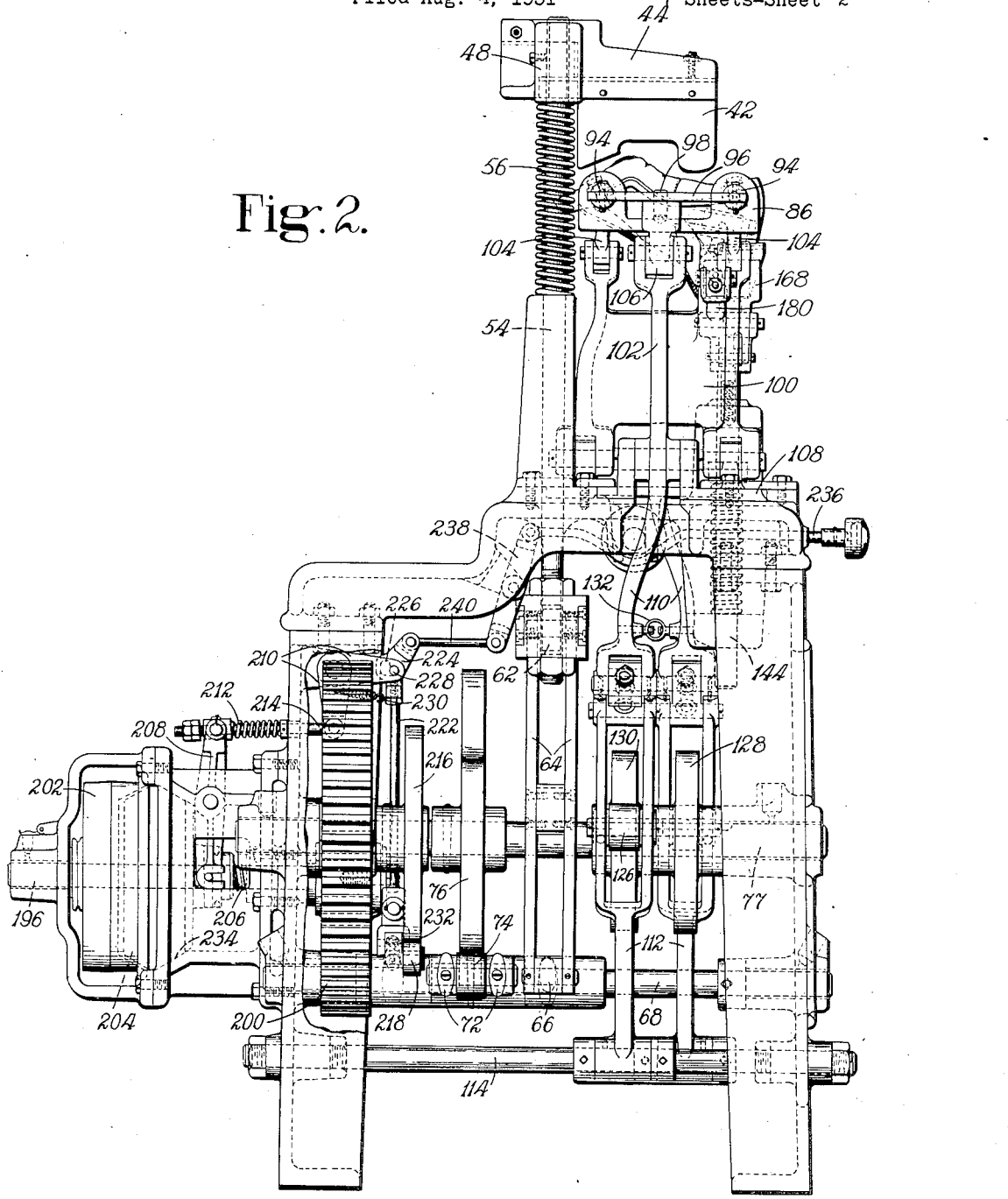
Fig. 2 is a view of the machine in left-hand side elevation, with parts broken away.
Figure 3:
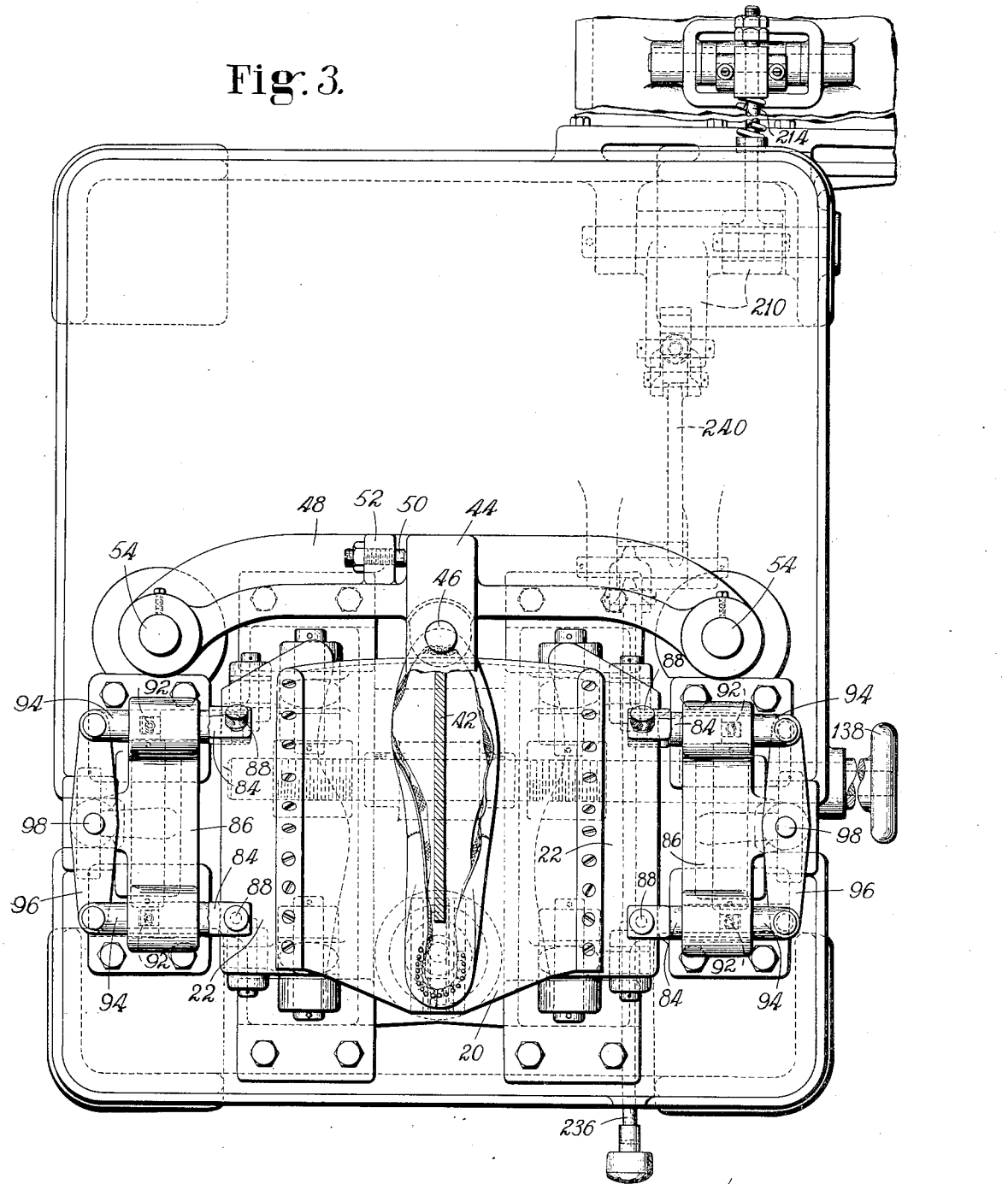
Fig. 3 is a plan view of the machine with parts broken away.

In the course of the operation of the machine the last and shoe supported as above described are depressed within the flexible elastic apron 20 by a shoe rest member or presser 42 which consists of a comparatively narrow vertical plate arranged to extend lengthwise of the shoe and to engage the insole at the forepart and shank, the plate having a recess therein to clear portions of the apron 20 that may be moved well in over the insole at the narrowest portion of the shank. The member 42 is detachably supported on an arm 44 which is mounted for lateral swinging movement about a vertical rod 46 (Fig. 3) fast on a cross-head 48. The member 42 may thus be swung horizontally by the operator into or out of operative position to permit a shoe to be readily presented to the machine and removed therefrom and also to facilitate the application of cement to the marginal portion of the upper materials, as hereinafter described. A screw 50 mounted in a lug 52 on the cross-head 48 determines adjustably the proper position of the arm 44 and the member 42 in operating on a shoe. The cross-head 48 is fast on a pair of rods 54 vertically movable in bearings in the frame of the machine and is raised by springs 56 mounted on these rods. Connected to the lower ends of the rods 54 is a cross-head 58 (Fig. 4) provided with a rack plate 60 the teeth of which are engaged by a pinion 62 mounted on the upper end of a link 64 the lower end of which is pivoted on a lever 66 fast on a shaft 68 mounted to turn in bearings in the frame of the machine. The pinion 62 is also in engagement with a rack plate 70 which is fast on the frame, so that as the link 64 is moved downwardly or upwardly by the lever 66 the movements imparted to the cross-head 48 are accelerated. Also fast on the shaft 68 is an arm 72 (Fig. 2) which carries a roll 74 in engagement with a cam wheel 76 fast on a cam shaft 77. This cam wheel is provided with three cams 78, 80 and 82 (Fig. 4) for imparting to the presser 42 downward movement three different times in the cycle of operations, as hereinafter more particularly described.

The overlaying members or plates 22 to which the apron 20 is fastened are movable inwardly toward the last to render the apron effective by frictional contact with the upper to work the opposite sides of the upper heightwise of the last as the last is depressed, and are arranged to act thereafter through the apron to lay the marginal portion of the upper inwardly over the bottom face of the insole. In order to press the upper close to the edge of the insole and to lay its margin inwardly with uniformly effective pressure all along the forepart and shank portions of the insole, the edges of the plates 22 are curved widthwise of the last in substantial conformity to the curvatures of the side edges of the insole and the plates are also curved heightwise of the last in substantial conformity to the lengthwise curvature of the bottom face of the last and of the edges of the insole on the last. Each of the plates 22 is supported in slots formed in a pair of plungers 84 spaced apart lengthwise of the shoe and mounted for sliding movements in bearings formed in a holder 86 which is movable in directions widthwise of the shoe. Pins 88 extending through slots 90 (Fig. 8) in the plate connect the latter detachably to its two supporting plungers 84. Each plunger 84 is connected at 92 to another sliding plunger 94 in such manner that the plunger 84 may be turned relatively to the plunger 94 to different positions required to receive plates 22 of different shapes for use in lasting shoes of different styles. Each pair of plungers 94 are connected at their outer ends to a lever 96 which is pivoted at 98 midway between its opposite ends on the holder 86. The levers 96 thus serve as equalizing levers, the plates 22 being permitted to turn about axes extending heightwise of the last to adjust themselves to the shoe and being so controlled that each plate applies substantially equal pressures at the forepart and shank portions of the shoe.

Each holder 86 is supported and operated by parallel links 100 and 102 of substantially equal lengths whereby it is moved toward and from the shoe without any tipping movement of the plate 22 relatively to a horizontal plane. The link 100 is extended for a considerable distance lengthwise of the shoe (Fig. 2) and is pivotally connected to lugs 104 on the holder 86 in locations substantially opposite the toe and heel-end portions of the shoe. The link 102 is pivotally connected to a lug 106 substantially midway between the front and rear ends of the holder 86. The links 100 and 102 are spaced apart widthwise of the shoe and are pivotally mounted at their lower ends on lugs formed on a supporting plate 108. The link 102 is constructed and arranged to serve as a lever for operating the holder 86, and for this purpose has a downwardly extending arm 110 yieldingly connected to a lever 112 which is pivoted at 114 on the frame of the machine. The connections between the lever 112 and the arm 110 comprise a rod 116 pivotally connected to the lever 112 and slidingly mounted in a sleeve 118 (Fig. 5) adjustably threaded in a block 120 which is pivoted on the forked lower end of the arm 110, a spring 122 being provided for operating the arm 110 yieldingly by the movement of the lever 112. Nuts 124 on the rod 116 are arranged to limit relative movement of the arm 110 and the lever 112 in one direction. It will be understood that these various parts for moving and controlling each holder 86 are substantially duplicated at the opposite sides of the machine, except for small differences in design. The levers 112 are provided with rolls 126 one of which is engaged by a cam 128 and the other by a cam 130 on the cam shaft 77, these cams being so arranged that operative movements in opposite directions are imparted simultaneously to the two levers. Connected to the arms 110 is a spring 132 by the action of which the rolls 126 are maintained at all times in engagement with their cams and the holders 86 are moved outwardly away from the shoe when permitted by the cams.

To adjust the machine for shoes of different widths the two plates 108 on which are mounted the parallel links 100 and 102 at the opposite sides of the machine are slidingly movable in directions widthwise of the shoe in guideways formed on the frame and are provided with lugs 134 (Fig. 5) having right and left-hand threads therein engaged by corresponding threads on a rod 136 which is mounted in bearings in the frame and has on its outer end a hand wheel 138 for turning it. Collars 140 on the rod 136 at opposite sides of a lug 142 on the frame prevent the rod from moving lengthwise and thus render it effective as it is turned to adjust the link-supporting plates 108 simultaneously toward or from each other.

To assist in supporting the shoe and in pressing its bottom face upwardly against the apron 20 after the overlaying members 22 have been moved inwardly over the shoe bottom, there is provided a plunger 144 which is vertically movable in bearings in the frame and is normally elevated by a spring 146 in engagement with a collar 148 on the plunger, this collar being arranged to limit the upward movement of the plunger by engagement with a portion of the frame, as illustrated in Fig. 1. The plunger 144 is arranged underneath the block 28 and that portion of the apron 20 to which this block is fastened, and is depressed against the resistance of the spring 146 by the action of this block thereon during the downward movement of the last and shoe. Supported on this plunger is mechanism arranged to cooperate with the block 28 to prevent lateral tipping of the last and shoe in the lasting operation, so as to insure that the opposite side edges of the insole will be presented in proper relation to the overlaying members 22. This mechanism comprises a pair of clamp arms 150 pivotally mounted on pins 152 on the head 154 of the plunger 144 and arranged to engage the U-shaped clamp 30 whereby the apron 20 is fastened to the block 28. These clamp arms are controlled by toggle links 156 (Fig. 4) pivotally connected to their lower ends, these two links being connected to a pin 158 which is movable in a slot in the head 154 and is carried by a small plunger 160 in this head. The plunger 160 is normally elevated by a spring 162 in the plunger 144, as illustrated in Fig. 1. The upper end of the plunger 160 is engaged by the U-shaped clamp 30, and at the beginning of the downward movement of the shoe is depressed against the resistance of the spring 162 and acts through the toggle links 156 to swing the clamp arms 150 inwardly against the plate 30, so that these arms maintain the block 28 in an upright position during the lasting operation. Thereafter the clamping means is moved farther downwardly with the plunger 144.

In order to prevent distortion of the heel-end portion of the upper by the upward pull of the apron 20 on the portions of the upper located forwardly of the heel end, the machine is provided with means for clamping the opposite sides of the heel end of the upper against the last. This means comprises clamp members 164 (Figs. 6 and 7), preferably of rubber or leather, arranged to engage the sides of the heel-end portion of the upper near the top edge of the upper, these members being mounted on the opposite ends of a thin resilient plate 166 which is fastened to the block 28 and is so formed as to hold the clamp members initially in widely separated relation, as illustrated in Fig. 1. It will be observed that the clamp members 164 and the ends of the plate 166 are between the apron 20 and the shoe. For pressing these clamp members inwardly against the upper there are pivotally mounted on the pins 152 arms 168 provided on their upper ends with rolls 170 mounted in holders 172 (Fig. 6) that are swiveled on the arms, these rolls being arranged to act through the apron to spring the ends of the resilient plate 166 inwardly and to press the clamp members 164 against the upper when the arms are swung inwardly toward the shoe. It will be understood that the rolls 170 adjust themselves to the work by the turning of their holders 172 and that they may turn on their bearings in response to friction of the apron thereon as the apron is stretched. The arms 168 are swung toward the shoe by the previously-mentioned links 100 through springs 174 which are mounted on rods 176 pivotally connected to the arms and slidingly movable in blocks 178 that are pivoted on brackets 180 on the links 100. By engagement with nuts 182 on the rods 176 the blocks 178 act through the rods to swing the arms 168 away from the shoe.

Figure 8:
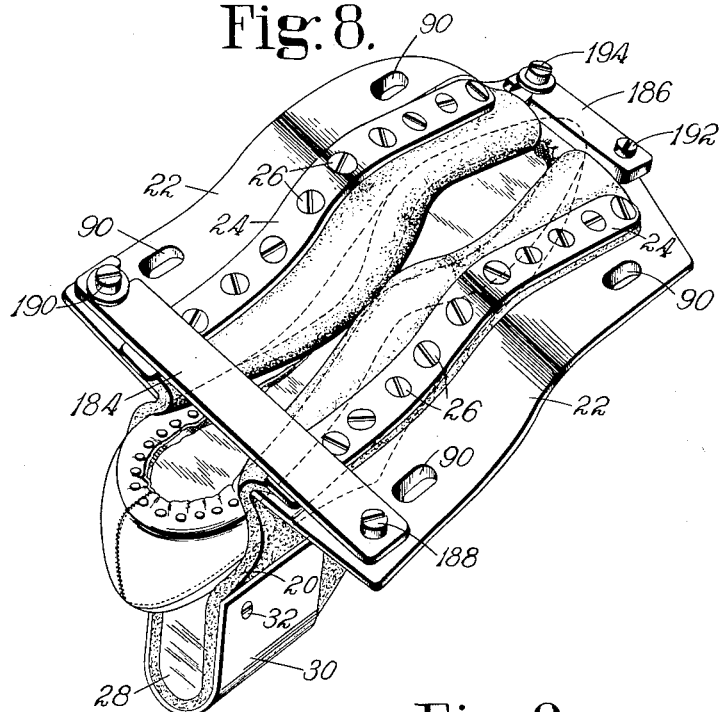
Fig. 8 is a perspective view showing the lasting means removed from the machine with the shoe while holding the upper in lasted position.

In order to fasten the overlaying members 22 and the flexible elastic apron 20 in upper-holding positions so that these parts may be removed from the machine with the shoe if conditions are such as to render this desirable, there are provided members 184 and 186 (Fig. 8) for connecting the members 22 in fixed relation to each other. The member 184 is pivoted to one of the members 22 by a screw 188 and has a hook-shaped end for connecting it to a screw 190 on the other member 22. Similarly the member 186 is pivotally mounted on a screw 192 on one of the members 22 and has a hook-shaped end for connecting it to a screw 194 on the other member 22. It will be understood that when the members 22 are at the limits of their operative movements over the shoe they are in such relation to each other that the fastening members 184 and 186 may be readily swung to their operative positions, as illustrated in Fig. 8. The pins 88 which connect the members 22 to the plungers 84 are then removed by the operator, and thereafter in the return of the parts of the machine to starting positions the members 22 are released, so that these members and the apron 20, together with the fastening members 184 and 186, may be removed by the operator. The fastening members 184 and 186 hold the members 22 in fixed relation to each other, and the resiliency of the rubber apron 20 serves to hold the bottom of the shoe pressed firmly against portions of the apron that are between the shoe and the members 22.

For operating the cam shaft 77 there is provided a driving shaft 196 on which is mounted a pinion 198 in engagement with a much larger gear wheel 200 on the cam shaft so as to drive the latter at reduced speed. Mounted to turn on the shaft 196 is a pulley 202 (Fig. 2) which is formed to serve as one element of a clutch, the other clutch member 204 being splined on the shaft and controlled by a spring 206 which tends to force it into engagement with the pulley. For withdrawing the clutch member 204 from engagement with the pulley 202 there is provided a lever 208 which is operated yieldingly by a bell-crank lever 210 through a spring 212, this spring being mounted on a rod 214 connected to one arm of the bell-crank lever and slidingly movable in a block pivoted on the upper end of the lever 208. For operating the bell-crank lever 210 there is provided a cam wheel 216 fast on the cam shaft 77 the periphery of which is in engagement with a roll 218 mounted on one end of a lever 220 (Fig. 4) the other end of which is mounted to turn on the shaft 68. Connected to the lever 220 is a link 222 which has fast on its upper end a plate 224 provided with a slot 226 through which projects a pin 228 carried by one arm of the bell-crank 210. The slot 226 has a substantially vertical portion and a substantially horizontal portion, and when the parts are in the positions illustrated in Fig. 2 with the machine at rest the pin 228 is in the horizontal portion of the slot, the plate 224 being held in that relation to the pin by a spring 230 which is connected to the link 222 and tends to swing the link toward the left, the connection of the link to the lever 220 being such as to permit it to move laterally. With the parts in the starting positions indicated in Fig. 2 the lever 220 is maintained in a depressed position by a cam 232 on the cam wheel 216, and through the link 222, the bell-crank lever 210 and the spring 212, the lever 208 is maintained in position to disconnect the clutch member 204 from the pulley 202 and to maintain this member in engagement with a brake surface 234. For starting the machine there is provided means for swinging the link 222 and its plate 224 toward the right (Fig. 2), whereby the vertical portion of the slot 226 is carried into position to permit upward movement of the pin 228, so that the clutch-controlling spring 206 is released and permitted to move the clutch member 204 into engagement with the pulley 202. To move the plate 224 in that direction there is provided a push rod 236 connected to one arm of a lever 238 the other arm of which is connected by a link 240 to the plate 224. Upon the starting of the machine the cam 232 is carried away from the roll 218, thus permitting the link 222 to be moved upwardly by a spring (not shown) until the horizontal portion of the slot 226 is again opposite the pin 228, whereupon the spring 230 moves the plate 224 to the left so that the pin is again positioned in the horizontal portion of the slot. With the parts in these positions the machine continues to run until another cam on the cam wheel 216 depresses the lever 220, such downward movement of the lever resulting in the swinging of the bell-crank 210 in the direction to move the clutch member 204 to the right to stop the machine. In the construction shown there are two cams 242 and 244 (Fig. 4) on the cam wheel 216 in addition to the cam 232, so that the machine is brought to a stop twice before it arrives at the end of its cycle, as more particularly hereinafter explained.

Figure 10:
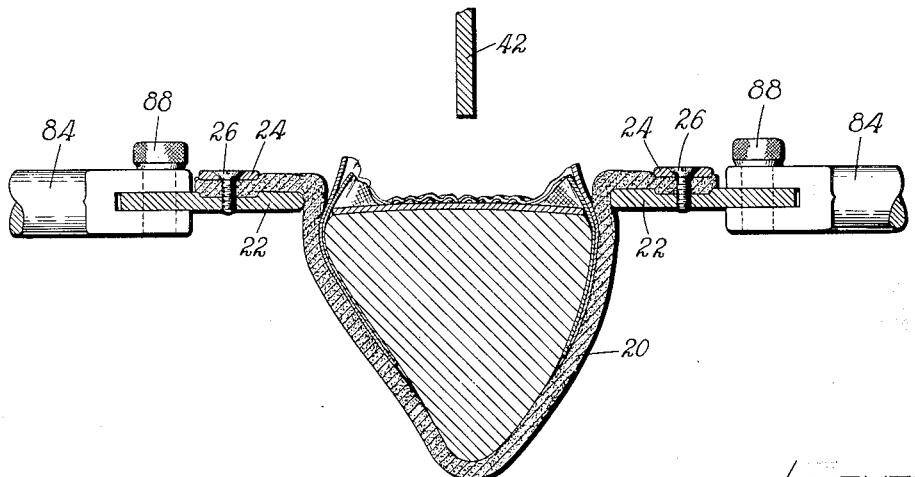
Fig. 10 is a view in vertical section of the flexible apron, the overlaying members and the shoe rest or presser in the positions that they occupy when the upper materials are held ready for cement to be applied thereto; and, Fig. 11 is a view of a shoe as it appears after the operation of the machine thereon.

Before using the machine to last the sides of the shoe the operator makes sure that the machine is equipped with an apron 20 and with overlaying members 22 corresponding to the style of shoe upon which the machine is to operate and that the overlaying members are properly adjusted for shoe width by the hand wheel 138. The operator then mounts a last and shoe on the spindle 38 as illustrated in Fig. 1, and by moving it lengthwise with the spindle presents it in proper relation to the members 22. The shoe as thus mounted is supported by the flexible lasting apron 20, the clamp plate 30 by which the apron is fastened to the shoe support block 28 resting substantially in engagement with the upper end of the small plunger 160. With the parts in these positions the operator starts the machine by forward movement of the push rod 236. Thereupon the presser 42 is lowered into engagement with the insole by the cam 78 and depresses the last and shoe. In the first part of this downward movement of the shoe the plunger 160 is depressed to swing the clamp arms 150 inwardly against the plate 30 so as to maintain the shoe-support block 28 in an upright position, and in the continued downward movement of the shoe the plunger 144 is depressed against the resistance of the spring 146. As the shoe is moved downwardly the overlaying members 22 are moved inwardly toward it by the action of the cams 128 and 130 on the levers 112, thus carrying the rubber apron 20 inwardly and pressing it against the sides of the shoe to render it more effective by frictional contact with the upper to work the upper heightwise of the last as the shoe is depressed, the apron being stretched more or less by the downward movement of the shoe to assist in working and pressing the upper tightly into conformity to the contour of the last. As the members 22 are moved toward each other the arms 168 also are swung inwardly so that the rolls 170 act through the apron to press the clamp members 164 against the opposite sides of the heel end of the upper to prevent distortion of this portion of the upper. The machine is brought to a stop by the action of the cam 242 on the lever 220 with the parts in the positions illustrated in Fig. 10, the apron 20 and the members 22 then holding the upper tightly conformed to the last and in close relation to the edge of the insole with the lasting margin of the upper materials, i. e., that portion of the materials that is to be laid over the bottom face of the insole, projecting beyond the edge of the insole. Before the machine thus comes to a stop the presser 42 is raised out of contact with the insole by the springs 56, as permitted by the shape of the cam wheel 76. With the parts in these positions the operator is enabled to apply cement to the lasting margin of the upper materials, the presser 42 being preferably swung to one side to facilitate this operation. It will be evident that the portions of the upper materials to which the cement should be applied are thus accurately determined by the machine, so that insurance is afforded that the cement will be applied not only in all locations where it is needed, but only where it is needed, without danger of its presence on portions of the upper materials where it would be objectionable.

Figure 4:
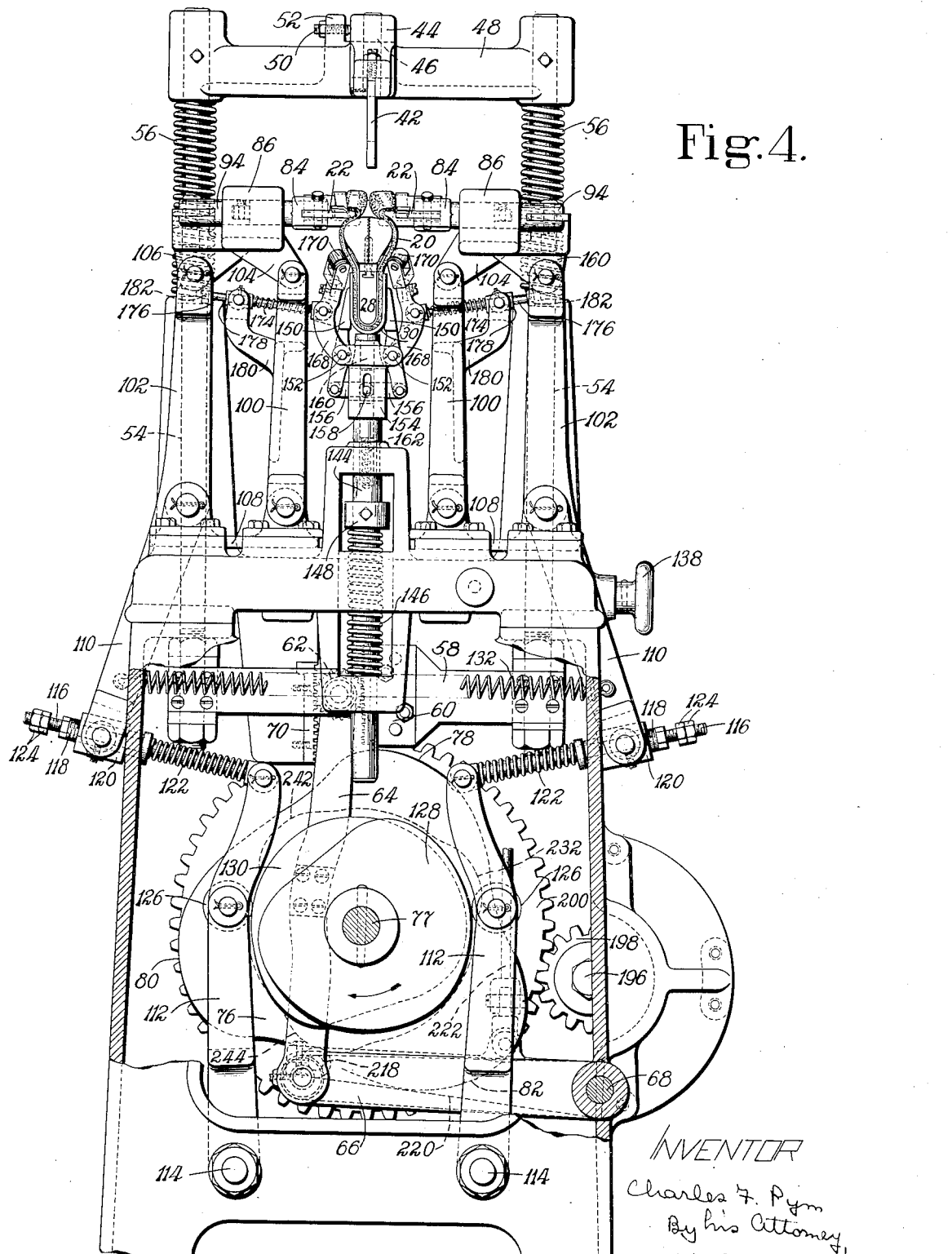
Fig. 4 is a view partly in front elevation and partly in section, illustrating the positions of the parts with the shoe under pressure at the end of the lasting operation.

Having applied the cement, the operator again swings the presser 42 into position over the shoe and starts the machine a second time. The presser 42 is then lowered a little farther than before by the action of the cam 80 on the lever 66, so that the bottom of the shoe is depressed somewhat below the level of the overlaying members 22 to permit these members to lay the marginal portion of the upper materials over the insole without displacement of the margin of the insole. As the bottom of the shoe is forced downwardly below the members 22, these members are operated yieldingly by the cams 128 and 130 through the springs 122 to force the apron 20 inwardly over the insole while further stretching the apron. The upper is thus drawn tightly inward over the edge of the insole and is laid upon the bottom face of the insole. The presser 42 is then again raised out of contact with the shoe, permitting the bottom of the shoe to be pressed more firmly upward against the apron and the members 22 by the elasticity of the apron and by the action of the plunger 144. The machine is then brought to a stop by the action of the cam 244, as illustrated in Fig. 4. If the shoe is being lasted by the use of quick-setting cement, the machine is permitted to remain at rest as illustrated in Fig. 4 for a short interval sufficient to permit the cement substantially to set. Thereafter the operator again starts the machine, whereupon the cam 82 operates to depress the shoe to a position even lower than that to which it was moved by the cam 80, to avoid any danger of loosening the cemented margin of the upper by the outward movement of the overlaying members 22. The parts of the machine are then returned to their starting positions, the shoe being released so that it may be removed from the machine by the operator. The machine is finally brought to a stop in starting position by the cam 232.

Figure 9:
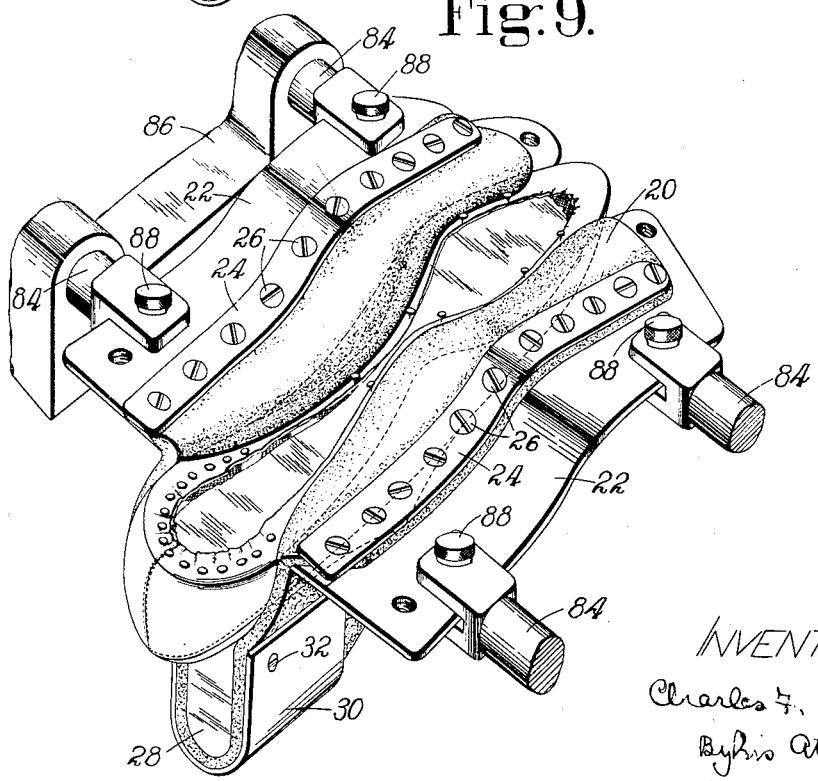
Fig. 9 is a perspective view illustrating the alternative use of the lasting means to position the marginal portion of the upper for the reception of temporary upper-holding fastenings.
Figure 11:
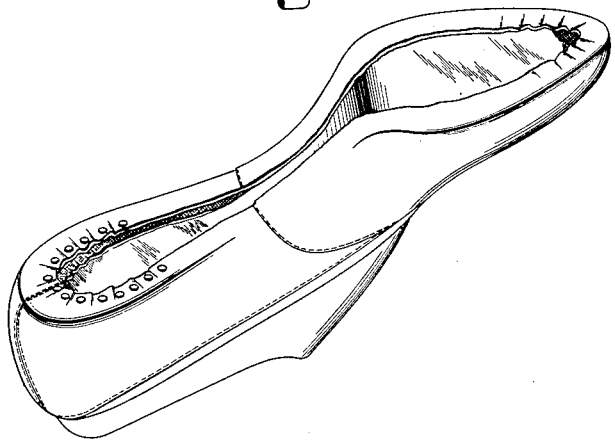

If a comparatively slow-setting cement is used in the lasting operation, and it is desired to insert a few fastenings such as tacks to assist in maintaining the margin of the upper in lasted position until the cement has set, as illustrated in Fig. 9, the overlaying members 22 and the portions of their operating mechanisms that are carried by the slides 108 will be so adjusted by the hand wheel 138 that at the end of the inward movement of the overlaying members a small portion of the margin of the upper will be left exposed to permit the driving of the tacks while the machine is at rest in its second stopping position. Otherwise the machine will operate as hereinbefore described.

If it is desired to maintain the shoe under pressure after its removal from the machine, the fastening members 184 and 186 (Fig. 8) are used to fasten the overlaying members 22 together in the manner hereinbefore described when the machine is in its second stopping position illustrated in Fig. 4. The operator then removes the pins 88 whereby the members 22 are fastened to the plungers 84, and when the machine is again started these plungers are withdrawn from the members 22, so that the operator can remove the shoe with the members 22 and the apron secured thereon. The shoe with the upper thus held in lasted position will then be set aside to remain until the cement has set, after which the members 184 and 186 will be manipulated to release the shoe from the apron. If the machine is to operate in this manner the cam 82 will preferably be omitted, so that the presser 42 will not be moved downwardly in the third stage of the cycle. It will be understood that for operating on another shoe the operator will place another set of lasting parts in the machine, fastening the members 22 by means of the pins 88.

It will be observed that in accordance with the practice herein illustrated the shoe is lasted at its toe and heel ends before the sides are lasted in the manner described, the toe as herein shown having been previously lasted by the use of cement and the heel end lasted with tacks. Accordingly the machine herein disclosed operates to complete the lasting of the shoe. As hereinfore suggested, however, the utility of the invention is not dependent upon this particular order of steps in the manufacture of the shoe.

Having described the invention, what I claim as new and desire to secure by Letters Patent of the United States is:

1. In a machine for shaping uppers over lasts, flexible elastic lasting means arranged to support a last presented by the operator bottom upward with an upper and an insole thereon and to act on the upper at the opposite sides of the last between its toe and heel end portions, mechanism for effecting relative movement of said lasting means and the last in a direction heightwise of the last to cause said means by frictional contact with the upper to draw the upper tightly about the last, and overlaying devices curved similarly to the opposite side edges of the insole and arranged to act through said flexible lasting means to lay the marginal portion of the upper inwardly over the insole.

2. In a machine for shaping uppers over lasts, a flexible apron arranged to support a last presented by the operator bottom upward with an upper and an insole thereon and to engage the upper between its toe and heel end portions, mechanism for effecting relative movement of said apron and the last in a direction heightwise of the last to cause the apron to conform the upper tightly to the contour of the last, and overlaying devices curved widthwise of the last in substantial conformity to the curvature of the opposite side edges of the insole and curved heightwise of the last in substantial conformity to the lengthwise curvature of the bottom face of the last, said devices being arranged to act through the apron to lay the marginal portion of the upper inwardly over the insole.

3. In a machine for shaping uppers over lasts, a flexible elastic apron arranged to support a last presented by the operator bottom upward with an upper and an insole thereon and to act on the upper between its toe and heel end portions, means for depressing the last relatively to said apron by engagement with the insole to cause the apron by frictional contact with the upper to draw the upper tightly about the last, and overlaying devices curved widthwise of the last in substantial conformity to the curvature of the opposite side edges of the insole and curved heightwise of the last in substantial conformity to the lengthwise curvature of the bottom face of the last, said devices being arranged to act through the apron to lay the marginal portion of the upper inwardly over the insole.

4. In a machine for shaping uppers over lasts, flexible elastic lasting means arranged to support a last presented by the operator bottom upward with an upper and an insole thereon and to extend lengthwise of the last substantially from its toe-end portion to its heel-end portion, means for depressing the last relatively to said lasting means by engagement with the insole to cause said means by frictional contact with the upper to draw the upper tightly about the last, and overlaying devices arranged to engage said flexible lasting means continuously along the opposite sides of the shoe substantially from its toe-end portion to its heel-end portion and to act through said flexible means to lay the marginal portion of the upper inwardly over the insole, said overlaying devices being curved both widthwise and heightwise of the last in substantial conformity to the curvature of the opposite side edges of the insole on the last.

5. In a machine for shaping uppers over lasts, a flexible elastic apron arranged to extend across the top face of a last with an upper and an insole thereon and substantially from the toe-end portion to the heel-end portion of the last, means for moving the last heightwise relatively to said apron by engagement with the insole to cause the apron by frictional contact with the upper to conform the upper tightly to the contour of the last, and devices arranged to engage said apron continuously along the opposite sides of the last substantially from its toe-end portion to its heel-end portion and to act through the apron to lay the marginal portion of the upper inwardly over the insole, said devices being curved both widthwise and heightwise of the last in substantial conformity to the curvature of the opposite side edges of the insole on the last.

6. In a machine for shaping uppers over lasts, a flexible elastic apron arranged to extend across the top face of a last with an upper and an insole thereon and to act on the upper between its toe and heel end portions, means for moving the last heightwise relatively to said apron by engagement with the insole to cause the apron by frictional contact with the upper to draw the upper tightly about the last, and overlaying devices curved widthwise of the last in substantial conformity to the curvature of the opposite side edges of the insole and curved heightwise of the last in substantial conformity to the lengthwise curvature of the bottom face of the last, said devices being arranged to act through the apron to lay the marginal portion of the upper inwardly over the insole.

7. In a machine for shaping uppers over lasts, a flexible elastic apron arranged to extend across the top face of a last with an upper and an insole thereon and substantially from the toe-end portion of the last to its heel-end portion, means for forcing the last into said apron by engagement with the insole, overlaying members fastened to said apron at the opposite sides of the last to hold the apron and cause it to stretch in response to movement of the last and thereby to draw the upper tightly over the last, said members being curved both widthwise and heightwise of the last in substantial conformity to the curvature of the opposite side edges of the insole on the last, and means for moving said members toward each other to cause the apron to lay the marginal portion of the upper inwardly over the insole.

8. In a machine for lasting the opposite sides of shoes with cement, a flexible elastic apron arranged to extend lengthwise of a last with an upper and an insole thereon in position to act on the upper between its toe and heel end portions, means for effecting relative movement of said apron and the last in a direction heightwise of the last to cause the apron by frictional contact with the upper to conform the upper tightly to the contour of the last, and overlaying devices curved widthwise of the last in substantial conformity to the curvature of the opposite side edges of the insole and curved heightwise of the last in substantial conformity to the lengthwise curvature of the bottom face of the last, said devices being arranged to act through the apron to lay the lasting margin of the upper inwardly over the insole and to press it throughout its width into position to adhere to the insole.

9. In a machine for shaping uppers over lasts, a flexible elastic apron arranged to extend across the top face of a last with an upper and an insole thereon and to engage the upper between its toe and heel end portions, a presser for engaging the bottom face of the insole, power-operated means for effecting relative movement of said apron and presser in a direction heightwise of the last to cause the apron to draw the upper tightly about the last, overlaying devices curved both widthwise and heightwise of the last in substantial conformity to the curvature of the opposite side edges of the insole on the last, said devices being arranged to act through the apron to lay the marginal portion of the upper inwardly over the insole, and automatic means for imparting to said devices their overlaying movements.

10. In a machine for shaping uppers over lasts, a flexible elastic apron arranged to extend across the top face of a last with an upper and an insole thereon and substantially from the toe-end portion to the heel-end portion of the last, a presser for engaging the bottom face of the insole, power-operated means for operating said presser to move the last heightwise relatively to the apron to cause the apron to conform the upper tightly to the contour of the last, overlaying devices curved both widthwise and heightwise of the last in substantial conformity to the curvature of the opposite side edges of the insole on the last, said devices being arranged to act on the upper through the apron, and automatic means for moving said devices inwardly toward the shoe during the movement of the last by the presser and for thereafter moving them farther inwardly to lay the marginal portion of the upper over the insole.

11. In a machine for shaping uppers over lasts, a flexible elastic apron arranged to extend across the top face of a last with an upper and an insole thereon and to engage the upper between its toe and heel end portions, a presser for engaging the bottom face of the insole, overlaying devices curved both widthwise and heightwise of the last in substantial conformity to the curvature of the opposite side edges of the insole on the last, said devices being arranged to act on the upper through the apron, and power-driven mechanism comprising cams arranged respectively to operate said presser to move the last heightwise relatively to the apron and to operate said overlaying devices to lay the marginal portion of the upper inwardly over the insole after the heightwise movement of the last.

12. In a machine for shaping uppers over lasts, a flexible apron for conforming an upper to the contour of a last, devices arranged to act through said apron at the opposite sides of the last to lay the marginal portion of the upper inwardly over the bottom of the last, and parallel links of substantially equal lengths spaced apart widthwise of the last for supporting each of said devices and moving it toward and from the last.

13. In a machine for shaping uppers over lasts, a flexible apron for conforming an upper to the contour of a last, devices arranged to act through said apron at the opposite sides of the last to lay the marginal portion of the upper inwardly over the bottom of the last, parallel links of substantially equal lengths spaced apart widthwise of the last for supporting each of said devices and moving it toward and from the last, and cam-operated levers for imparting yieldingly to said devices their operative movements.

14. In a machine for shaping uppers over lasts, a flexible apron for conforming an upper to the contour of a last, devices curved similarly to the opposite side edges of an insole on the last and arranged to act through said apron to lay the marginal portion of the upper inwardly over the insole, and means for operating said devices while permitting them to turn about axes extending heightwise of the last to adjust themselves to the sides of the shoe.

15. In a machine for shaping uppers over lasts, a flexible apron for conforming an upper to the contour of a last, devices arranged to act through said apron at the opposite sides of the last to lay the marginal portion of the upper inwardly over the bottom of the last along a substantial portion of the length of the last, and means for operating said devices comprising equalizing mechanisms so constructed as to permit the devices to turn about axes extending heightwise of the last to adjust themselves to the shoe and to apply substantially equal pressures in different locations along the sides of the shoe.

16. In a machine for shaping uppers over lasts, a flexible apron for conforming an upper to the contour of a last, devices arranged to act through said apron at the opposite sides of the last to lay the marginal portion of the upper inwardly over the bottom of the last along a substantial portion of the length of the last, holders supporting said devices and movable widthwise of the last to operate them, equalizing levers mounted on said holders, and connections between said levers and the different devices, said levers and connections being arranged to permit the devices to turn about axes extending heightwise of the last to adjust themselves to the shoe and to apply substantially equal pressures in different locations along the sides of the shoe.

17. In a machine for shaping uppers over lasts, a flexible apron for conforming an upper to the contour of a last, overlaying members curved similarly to the opposite side edges of an insole on the last and arranged to act through said apron to lay the marginal portion of the upper inwardly over the insole, holders supporting said members and movable widthwise of the last to operate them, and connections between said members and their holders so constructed as to permit the members to turn about axes extending heightwise of the last to adjust themselves to the shoe.

18. In a machine for shaping uppers over lasts, a flexible apron for conforming an upper to the contour of a last, overlaying members curved similarly to the opposite side edges of an insole on the last and arranged to act through said apron to lay the marginal portion of the upper inwardly over the insole, holders supporting said members and movable widthwise of the last to operate them, plungers slidingly mounted in said holders and connected to the overlaying members in different locations lengthwise of the shoe, and equalizing levers mounted on the holders and connected to said plungers.

19. In a machine for shaping uppers over lasts, overlaying devices curved similarly to the opposite side edges of an insole on a last for laying the marginal portion of an upper inwardly over the insole between its toe and heel end portions, and means for imparting to said devices their overlaying movements comprising mechanisms so constructed as to permit the devices to turn about axes extending heightwise of the last to adjust themselves to the shoe.

20. In a machine for shaping uppers over lasts, overlaying devices curved similarly to the opposite side edges of an insole on a last for laying the marginal portion of an upper inwardly over the insole, holders supporting said devices and movable widthwise of the last to operate them, and equalizing connections between said devices and their holders so constructed as to permit the different devices to turn about axes extending heightwise of the last to adjust themselves to the shoe and to apply substantially equal pressures in different locations along the sides of the shoe.

21. In a machine for shaping uppers over lasts, overlaying devices curved similarly to the opposite side edges of an insole on a last for laying the marginal portion of an upper inwardly over the insole between its toe and heel end portions, holders supporting said devices, and parallel links of substantially equal lengths spaced apart widthwise of the last for supporting each of said holders and moving it toward and from the last.

22. In a power-operated lasting machine, lasting means constructed and arranged to last the opposite sides of a shoe at one operation substantially from its toe-end portion to its heel-end portion, power-operated mechanism for effecting relative movement of said lasting means and a last having an upper and an insole thereon to work the upper heightwise of the last and thereafter to lay its marginal portion inwardly over the insole, and automatic means for bringing the machine to a stop between the operations of working the upper heightwise of the last and of laying its margin over the insole and again after the overlaying operation with the margin of the upper pressed upon the insole.

23. In a power-operated lasting machine, a flexible elastic apron arranged to extend across the top face of a last with an upper and an insole thereon and to act on the upper between its toe and heel end portions, power-operated means for effecting relative movement of said apron and the last heightwise of the last to cause the apron by frictional contact with the upper to draw the upper tightly about the last, power-operated means arranged to act thereafter through said apron to lay the marginal portion of the upper inwardly over the insole, and automatic means for bringing the machine to a stop at the end of said relative movement of the apron and the last and again at the end of the overlaying operation.

24. In a power-operated machine for lasting the opposite sides of shoes with cement, lasting means constructed and arranged to act at one operation to work an upper heightwise of a last substantially from its toe-end portion to its heel-end portion and thereafter to lay the marginal portion of the upper inwardly over an insole on the last into position to adhere to the insole, and automatic means for bringing the machine to a stop after the working of the upper heightwise of the last and prior to the overlaying operation to permit cement to be applied to the marginal portion of the upper materials.

25. In a power-operated machine for lasting the opposite sides of shoes with cement, lasting means constructed and arranged to last the opposite sides of a shoe at one operation substantially from its toe-end portion to its heel-end portion, power-operated mechanism for effecting relative movement of said lasting means and a last having an upper and an insole thereon to work the upper heightwise of the last, power-operated mechanism for operating said lasting means thereafter to lay the marginal portion of the upper inwardly over the insole into position to adhere to the insole, and automatic means for bringing the machine to a stop with said lasting means holding the upper close to the edge of the insole prior to the overlaying operation to permit cement to be applied to the marginal portion of the upper materials.

26. In a power-operated machine for lasting the opposite sides of shoes with cement, a flexible elastic apron arranged to extend across the top face of a last with an upper and an insole thereon and to act on the upper between its toe and heel end portions, power-operated means for effecting relative movement of said apron and the last heightwise of the last to cause the apron by frictional contact with the upper to draw the upper tightly about the last, overlaying devices curved both widthwise and heightwise of the last in substantial conformity to the curvature of the opposite side edges of the insole on the last, said devices being arranged to act on the upper through the apron, power-operated means for operating said devices to lay the marginal portion of the upper inwardly over the insole, and automatic means for bringing the machine to a stop with said devices positioned near the edge of the insole prior to the overlaying operation to permit cement to be applied to the marginal portion of the upper materials.

27. In a machine for lasting the opposite sides of shoes with cement, flexible lasting means for working an upper heightwise of a last by frictional contact therewith between its toe and heel end portions, overlaying devices curved both widthwise and heightwise of the last in substantial conformity to the curvature of the opposite side edges of an insole on the last, said devices being arranged to act through the flexible lasting means to lay the marginal portion of the upper inwardly over the insole into position to adhere to the insole, and means for maintaining said devices and the flexible lasting means in position to hold the upper close to the edge of the insole after the working of the upper heightwise of the last to permit cement to be applied to the marginal portion of the upper materials prior to the overlaying operation.

28. In a machine for lasting the opposite sides of shoes with cement, a flexible elastic apron arranged to extend across the top face of a last having an upper and an insole thereon and to engage the upper between its toe and heel end portions, a presser for engaging the bottom face of the insole, means for effecting relative movement of said apron and presser to cause the apron to work the upper heightwise of the last by frictional contact therewith, overlaying devices curved both widthwise and heightwise of the last in substantial conformity to the curvature of the opposite side edges of the insole on the last, said devices being arranged to act through the apron to lay the marginal portion of the upper inwardly over the insole, and means for maintaining said devices and the apron in position to hold the upper close to the edge of the insole after the working of the upper heightwise of the last to permit cement to be applied to the marginal portion of the upper materials prior to the overlaying operation.

29. In a machine for lasting the opposite sides of shoes with cement, a rubber apron arranged to extend across the top face of a last having an upper and an insole thereon and to extend lengthwise of the last substantially from its toe-end portion to its heel-end portion, overlaying devices at the opposite sides of the last having edges curved both widthwise and heightwise of the last in substantial conformity to the curvature of the opposite side edges of the insole on the last, said devices being arranged to act through the apron to lay the marginal portion of the upper inwardly over the insole into position to adhere to the insole, means for depressing the last within said apron by engagement with the insole, and means for moving said devices toward each other into positions to press the upper close to the sides of the last along the edges of the insole and for maintaining them in those positions prior to the overlaying operation to permit cement to be applied to the marginal portion of the upper materials.

30. In a lasting machine, flexible lasting means arranged to act frictionally on an upper at the sides of a last to work the upper heightwise of the last and also arranged to lay the marginal portion of the upper thereafter inwardly over an insole on the last, a presser for engaging the insole and moving the last heightwise relatively to said lasting means prior to the overlaying operation, means for withdrawing said presser from the insole to a position a substantial distance away from the insole after the beginning of the overlaying operation, and automatic means for bringing the machine to a stop with the presser in that position and with the upper held by the lasting means.

31. In a lasting machine, a flexible elastic apron arranged to extend across the top face of a last having an upper and an insole thereon and to engage the upper between its toe and heel end portions, devices arranged to act through said apron to lay the marginal portion of the upper inwardly over the insole and press it upon the insole, a presser for engaging the insole, means for operating said presser to force the last into the apron prior to the overlaying operation and for withdrawing the presser from the insole to a position a substantial distance away from the insole after the beginning of the overlaying operation, and automatic means for bringing the machine to a stop with the presser in that position and with the upper held by the overlaying devices.

32. In a machine for lasting shoes with cement, lasting means for working an upper heightwise of a last and for thereafter laying its marginal portion inwardly over an insole on the last, a presser for engaging the insole, and means for operating said presser to move the last relatively to the lasting means to cause said means to work the upper heightwise of the last and for then withdrawing the presser from the insole prior to the overlaying operation to permit cement to be applied to the margin of the upper materials.

33. In a machine for lasting shoes with cement, a flexible elastic apron arranged to extend across the top face of a last having an upper and an insole thereon and to engage the upper at the sides of the last, devices arranged to act through said apron to lay the marginal portion of the upper inwardly over the insole and press it upon the insole, a presser for engaging the insole, and means for operating said presser to force the last into the apron and for then withdrawing the presser from the insole prior to the overlaying operation to permit cement to be applied to the margin of the upper materials.

34. In a power-operated lasting machine, lasting means constructed and arranged to work an upper heightwise of a last and to lay its marginal portion inwardly over an insole on the last, a presser for engaging the insole and moving the last heightwise relatively to said lasting means, automatic means for bringing the machine to a stop after the overlaying operation with the marginal portion of the upper pressed upon the insole by the lasting means, and automatic means for withdrawing said presser from engagement with the insole before the machine is thus brought to a stop.

35. In a power-operated lasting machine, lasting means constructed and arranged to lay the marginal portion of an upper inwardly over an insole on a last and to hold the upper while fastenings are driven to fasten it to the insole, a presser arranged to engage the insole to determine the heightwise position of the last in the lasting operation, automatic means for bringing the machine to a stop after the overlaying operation to permit the driving of the fastenings, and automatic means for withdrawing said presser from engagement with the insole before the machine is thus brought to a stop to facilitate the driving of the fastenings.

36. In a power-operated lasting machine, a flexible elastic apron arranged to extend across the top face of a last having an upper and an insole thereon, a presser for engaging the insole, mechanism for effecting relative movement of said apron and presser in a direction heightwise of the last to cause the apron to draw the upper tightly about the last, means arranged to act through said apron to lay the marginal portion of the upper inwardly over the insole, automatic means for bringing the machine to a stop after the overlaying operation with the marginal portion of the upper pressed upon the insole, and automatic means for withdrawing said presser from engagement with the insole before the machine is thus brought to a stop.

37. In a power-operated lasting machine, lasting means constructed and arranged to work an upper heightwise of a last and to lay its marginal portion inwardly over an insole on the last, a presser for engaging the insole and moving the last heightwise relatively to the lasting means prior to the overlaying operation, automatic means for bringing the machine to a stop after the overlaying operation with the marginal portion of the upper pressed upon the insole by the lasting means, and automatic means for withdrawing said presser from engagement with the insole before the machine is thus brought to a stop and for moving it again into position to control the shoe and last when the machine is again started.

38. In a power-operated lasting machine, lasting means constructed and arranged to work an upper heightwise of a last and to lay its marginal portion inwardly over an insole on the last, a presser for engaging the insole in the lasting operations, automatic means for bringing the machine to a stop between the operations of working the upper heightwise of the last and of laying its margin over the insole and again after the overlaying operation with the margin of the upper pressed upon the insole, and automatic means for withdrawing said presser from engagement with the insole prior to each stopping of the machine.

39. In a power-operated lasting machine, lasting means comprising a flexible elastic apron for working an upper heightwise of a last at the opposite sides of the last and for laying its marginal portion inwardly over an insole on the last, a presser for engaging the insole and depressing the last relatively to the lasting means, automatic means for bringing the machine to a stop between the operations of working the upper heightwise of the last and of laying its margin over the insole and again after the overlaying operation with the margin of the upper pressed upon the insole, and automatic means for withdrawing said presser from engagement with the insole prior to each stopping of the machine.

40. In a power-operated lasting machine, lasting means constructed and arranged to work an upper heightwise of a last and to lay its marginal portion inwardly over an insole on the last, a presser for engaging the insole, means for effecting relative movement of said lasting means and presser to work the upper heightwise of the last, automatic means for bringing the machine to a stop after said relative movement and prior to the overlaying operation, and means for withdrawing said presser from engagement with the insole before the machine is thus brought to a stop.

41. In a power-operated machine for lasting shoes with cement, lasting means constructed and arranged to work an upper heightwise of a last and thereafter to lay its marginal portion inwardly over an insole on the last into position to adhere to the insole, a presser for engaging the insole in the lasting operation, automatic means for bringing the machine to a stop after the working of the upper heightwise of the last and prior to the overlaying operation to permit cement to be applied to the marginal portion of the upper materials, and means for withdrawing said presser from engagement with the insole before the machine is thus brought to a stop.

42. In a power-operated machine for lasting the opposite sides of shoes with cement, lasting means comprising a flexible elastic apron for working an upper heightwise of a last and for laying the marginal portion of the upper inwardly over an insole on the last along the opposite sides of the forepart and shank portions of the insole, a presser constructed and arranged to engage the insole at its forepart and farther rearwardly and movable to depress the last relatively to the lasting means, automatic means for bringing the machine to a stop between the operations of working the upper heightwise of the last and of laying its margin over the insole to permit cement to be applied to the marginal portion of the upper materials, and means for withdrawing said presser from engagement with the insole before the machine is thus brought to a stop.

43. In a machine for use in making shoes in which the uppers are fastened in lasted position by cement, flexible means for working an upper heightwise of a last into conformity to the contour of the last, a device movable inwardly toward the last into position to act through said flexible means to press the upper close to the last adjacent to the edge of the last bottom with its lasting margin projecting beyond said edge, and means for maintaining said device in that position to permit cement to be applied to the lasting margin of the upper materials.

44. In a machine for use in making shoes in which the uppers are fastened in lasted position by cement, a flexible elastic apron for working an upper heightwise of a last into conformity to the contour of the last, and means movable to force said apron inwardly toward the last to press the upper close to the last adjacent to the edge of the last bottom with its lasting margin projecting beyond said edge and for maintaining the apron in that position to permit cement to be applied to the lasting margin of the upper materials.

45. In a machine for use in making shoes in which the uppers are fastened in lasted position by cement, flexible elastic means for working an upper heightwise of a last at its opposite sides between its toe and heel end portions, members movable inwardly toward the last into positions to act through said flexible means to press the upper close to the sides of the last with its lasting margin projecting beyond the bottom face of the last, and means for maintaining said members in those positions to permit cement to be applied to the lasting margin of the upper materials.

46. In a machine for use in making shoes in which the uppers are fastened in lasted position by cement, means for conforming an upper to the contour of a last substantially from its toe-end portion to its heel-end portion at one operation, comprising members movable inwardly toward the last at its opposite sides into positions to press the upper close to the last adjacent to the edge of the last bottom with its lasting margin projecting beyond said edge, and means for maintaining said members in those positions to permit cement to be applied to the lasting margin of the upper materials.

47. In a machine for use in making shoes in which the uppers are fastened in lasted position by cement, means for conforming an upper to the contour of a last comprising devices curved both widthwise and heightwise of the last in substantial conformity to the curvature of the opposite side edges of an insole on the last, said devices being movable inwardly toward the last into positions to press the upper close to the sides of the last adjacent to the edge of the insole with its lasting margin projecting beyond said edge, and means for maintaining said devices in those positions to permit cement to be applied to the lasting margin of the upper materials.

48. In a machine for use in making shoes in which the uppers are fastened in lasted position by cement, a flexible apron for working an upper into conformity to the contour of a last between its toe and heel end portions, devices curved both widthwise and heightwise of the last in substantial conformity to the curvature of the opposite side edges of an insole on the last, said devices being movable inwardly toward the last into positions to act through said apron to press the upper close to the edge of the insole with its lasting margin projecting beyond said edge, and means for maintaining said devices in those positions to permit cement to be applied to the lasting margin of the upper materials.

49. In a machine for use in making shoes in which the uppers are fastened in lasted position by cement, a rubber apron for conforming an upper to the contour of a last between its toe and heel end portions, means for effecting relative movement of said apron and the last to work the upper heightwise of the last, and means movable to force said apron inwardly toward the last to press the upper close to the last adjacent to the edge of the last bottom with its lasting margin projecting beyond said edge and for maintaining the apron in that position to permit cement to be applied to the lasting margin of the upper materials.

50. In a machine for use in making shoes in which the uppers are fastened in lasted position by cement, a flexible elastic apron arranged to conform an upper to the contour of a last substantially from its toe-end portion to its heel-end portion, means for effecting relative movement of said apron and the last to work the upper heightwise of the last, devices curved both widthwise and heightwise of the last in substantial conformity to the curvature of the opposite side edges of the forepart and shank portions of an insole on the last and arranged to act on the upper through said apron, and means for moving said devices into positions to press the upper close to the last adjacent to the edge of the insole with its lasting margin projecting beyond said edge and for maintaining them in those positions to permit cement to be applied to the lasting margin of the upper materials.

51. In a machine for use in making shoes in which the uppers are fastened in lasted position by cement, means for engaging an upper frictionally at the sides of a last, a presser for engaging an insole on the last, mechanism for effecting relative movement of said upper-engaging means and presser in a direction heightwise of the last to cause said means to work the upper into conformity to the contour of the last with its lasting margin projecting beyond the edge of the insole, and means for withdrawing said presser from the insole with the upper in that position to permit cement to be applied to the lasting margin of the upper materials.

52. In a machine for use in making shoes in which the uppers are fastened in lasted position by cement, a flexible elastic apron for engaging an upper at the sides of a last, a presser for engaging an insole on the last, and mechanism for operating said presser to force the last into said flexible apron to cause the apron to conform the upper to the contour of the last with its lasting margin projecting beyond the edge of the insole and for then withdrawing said presser from the insole to permit cement to be applied to the lasting margin of the upper materials.

53. In a power-operated machine for use in making shoes in which the uppers are fastened in lasted position by cement, means for engaging an upper frictionally at the sides of a last, a presser for engaging an insole on the last, power-operated mechanism for effecting relative movement of said upper-engaging means and presser in a direction heightwise of the last to cause said means to work the upper into conformity to the contour of the last with its lasting margin projecting beyond the edge of the insole, automatic means for bringing the machine to a stop with the margin of the upper in that position to permit cement to be applied to said margin, and means for withdrawing said presser from the insole before the machine is thus brought to a stop.

54. In a power-operated machine for use in making shoes in which the uppers are fastened in lasted position by cement, means for engaging an upper along the sides of a last substantially from its toe-end portion to its heel-end portion simultaneously, a presser for engaging an insole on the last, power-operated means for effecting relative movement of said upper-engaging means and presser to conform the upper to the contour of the last and to position it with its lasting margin projecting beyond the edge of the insole, and automatic means for bringing the machine to a stop with the margin of the upper in that position to permit cement to be applied to said margin.

55. In a power-operated machine for use in making shoes in which the uppers are fastened in lasted position by cement, a flexible elastic apron arranged to act on an upper at the opposite sides of a last between its toe and heel end portions, a presser for engaging an insole on the last, power-operated means for effecting relative movement of said apron and presser to conform the upper to the contour of the last and to position it with its lasting margin projecting beyond the edge of the insole, and automatic means for bringing the machine to a stop with the margin of the upper in that position to permit cement to be applied to said margin.

56. In a lasting machine, lasting means comprising substantially inflexible members for laying the marginal portion of an upper inwardly into lasted position over the bottom of a last, said members being removable from the machine with the last while holding the upper in lasted position.

57. In a lasting machine, lasting means comprising members for laying the marginal portion of an upper inwardly into lasted position over the bottom of a last, and mechanism for fastening said members in upper-holding positions, said members and the fastening mechanism being removable from the machine with the last and shoe while holding the upper in lasted position.

58. In a lasting machine, lasting means comprising members curved similarly to the opposite side edges of an insole on a last and movable to lay the marginal portion of the upper inwardly into lasted position over the bottom face of the insole, said members being removable from the machine with the last while holding the upper in lasted position.

59. In a lasting machine, lasting means comprising a flexible upper-engaging device and a substantially inflexible member arranged to act through said flexible device to lay the marginal portion of an upper inwardly into lasted position over the bottom of a last, said device and member being removable from the machine with the last while holding the upper in lasted position.

60. In a lasting machine, lasting means comprising a flexible apron and a device arranged to act through said apron to work the marginal portion of an upper into lasted relation to an insole on a last, and means for fastening said device and apron in upper-holding position, said device and apron and the fastening means being removable from the machine with the last and shoe while holding the upper in lasted position.

61. In a lasting machine, lasting means constructed and arranged to lay the marginal portion of an upper inwardly into lasted position over the bottom face of an insole on a last along the opposite sides of the insole between its toe and heel end portions, said lasting means being removable from the machine with the last while holding the upper in lasted position.

62. In a lasting machine, lasting means constructed and arranged to work an upper heightwise of a last and to lay its marginal portion inwardly into lasted position over the bottom face of an insole on the last along the opposite sides of the insole between its toe and heel end portions, said lasting means being removable from 63. In a lasting machine, lasting means constructed and arranged to lay the marginal portion of an upper inwardly into lasted position over the bottom face of an insole on a last along the opposite sides of the insole, said lasting means comprising devices curved both widthwise and heightwise of the last in substantial conformity to the curvature of the opposite side edges of the insole on the last and removable from the machine with the last while holding the upper in lasted position.

64. In a lasting machine, lasting means constructed and arranged to lay the marginal portion of an upper inwardly into lasted position over the bottom face of an insole on a last, and mechanism for fastening said lasting means in upper-holding position, said lasting means and its fastening mechanism being removable from the machine with the last while holding the upper in lasted position.

65. In a lasting machine, flexible elastic lasting means for working an upper into lasted position with its marginal portion pressed upon the bottom face of an insole on a last, said lasting means being removable from the machine with the last while holding the upper in lasted position.

66. In a lasting machine, a flexible apron for working an upper into lasted relation to an insole on a last with its marginal portion pressed upon the bottom face of the insole, said apron being removable from the machine with the last while holding the upper in lasted position.

67. In a lasting machine, a flexible lasting device arranged to be wrapped around the top and sides of an upper on a last and to lay the marginal portion of the upper inwardly into lasted position over the bottom face of an insole on the last, said lasting device being removable from the machine with the last while holding the upper in lasted position.

68. In a lasting machine, a flexible apron arranged to be wrapped around the top and sides of an upper on a last and to lay the marginal portion of the upper inwardly into lasted position over the bottom face of an insole on the last, and means for fastening said apron in upper-holding position, said apron and its fastening means being removable from the machine with the last while holding the upper in lasted position.

69. In a lasting machine, a rubber apron arranged to work an upper heightwise of a last at its opposite sides and to lay the marginal portion of the upper inwardly into lasted position over the bottom face of an insole on the last, and means for fastening said apron in upper-holding position, said apron and its fastening means being removable from the machine with the last while holding the upper in lasted position.

70. In a lasting machine, a flexible elastic apron arranged to act on an upper frictionally at its opposite sides to draw the upper tightly about a last, members arranged to act through said apron to lay the marginal portion of the upper inwardly into lasted position over an insole on the last, and fastening mechanism for maintaining said members in upper-holding positions, said members and the apron, together with the fastening mechanism, being removable from the machine with the last while holding the upper in lasted position.

71. In a lasting machine, a flexible elastic apron arranged to conform an upper to the contour of a last between its toe and heel end portions, devices curved similarly to the opposite side edges of an insole on the last and arranged to act through said apron to lay the marginal portion of the upper inwardly into lasted position over the bottom face of the insole, and mechanism for fastening said devices and the apron in upper-holding position, said devices and the apron, together with the fastening mechanism, being removable from the machine with the last while holding the upper in lasted position.

72. In a lasting machine, a flexible apron arranged to conform an upper to the contour of a last between its toe and heel end portions, members arranged to act through said apron to work the marginal portion of the upper into lasted relation to an insole on the last, and mechanism for connecting said members together and for maintaining them in upper-holding positions, said members and the apron, together with the connecting mechanism, being removable from the machine with the last while holding the upper in lasted position.

73. In a lasting machine, a flexible apron arranged to be wrapped around the top and sides of an upper on a last, members arranged to act through said apron to lay the marginal portion of the upper inwardly into lasted position over the bottom face of an insole on the last, and devices for connecting said members together and for maintaining them in upper-holding positions, said members and the apron, together with said connecting devices, being removable from the machine with the last while holding the upper in lasted position.

74. Lasting means comprising a flexible device formed to extend over the top and sides of an upper on a last to shape the upper to the contour of the last and to lay its marginal portion inwardly into lasted position over the bottom of the last, said device being portable with the last while holding the upper in lasted position.

75. Lasting means comprising a flexible apron formed to extend over the top and sides of an upper on a last, and means arranged to act through said apron to conform the upper to the contour of the last and to lay its marginal portion inwardly into lasted position over an insole on the last, said apron and means being portable with the last while holding the upper in lasted position.

76. Lasting means comprising a flexible apron adapted to be wrapped about the top and sides of an upper on a last to conform the upper to the contour of the last and to lay its marginal portion inwardly over the bottom of the last, and means for fastening said apron in upper-holding position, said apron and fastening means being portable with the last and shoe.

77. Lasting means comprising a flexible elastic apron formed to extend over the top and sides of an upper on a last, and means for stretching said apron to draw the upper about the last and to lay its marginal portion inwardly over the bottom face of an insole on the last, said apron and its stretching means being portable with the last and shoe.

78. Lasting means comprising a flexible apron adapted to be applied about the top and sides of an upper on a last, and means for forcing portions of the apron at the opposite sides of the last inwardly over the bottom of the last to shape the upper to the contour of the last, said apron and means being portable with the last while holding the upper in lasted position.

79. Lasting means comprising a flexible apron adapted to be applied about the top and sides of an upper on a last for conforming the upper to the contour of the last, members connected to said apron for moving portions thereof inwardly toward each other over the bottom of the last, and means for fastening said members in upper-holding positions, said apron and members, together with the fastening means, being portable with the last and shoe.

80. Means for holding shoe uppers in lasted position, comprising a flexible member adapted to be wrapped about the top and sides of an upper on a last and to overlap the marginal portion of the upper and hold it pressed inwardly over the bottom of the last, said member being portable with the last and shoe.

81. Means for holding shoe uppers in lasted position, comprising a flexible elastic apron adapted to be wrapped around an upper on a last and to press the marginal portion of the upper upon the bottom face of an insole on the last, said apron being portable with the last and shoe.

82. Means for holding shoe uppers in lasted position, comprising a flexible member adapted to be applied about the top and sides of an upper on a last and to hold the marginal portion of the upper pressed upon the bottom face of an insole on the last, and means for retaining said member in upper-holding position, said member and its retaining means being portable with the last and shoe.

83. Means for holding shoe uppers in lasted position, comprising a flexible apron adapted to be applied about the top and sides of an upper on a last to hold the upper in conformity to the contour of the last substantially from its toe-end portion to its heel-end portion, and means for retaining said apron in upper-holding position, said apron and retaining means being portable with the last and shoe.

84. Means for holding shoe uppers in lasted position, comprising a flexible apron adapted to be applied about the top and sides of an upper on a last, members arranged to act through said apron to press the marginal portion of the upper upon the bottom face of an insole on the last, and means for fastening said members in upper-holding positions, said members and apron, together with the fastening means, being portable with the last and shoe.

85. Means for holding shoe uppers in lasted position, comprising a flexible elastic apron adapted to be wrapped about the top and sides of an upper on a last, members curved similarly to the opposite side edges of an insole on the last and arranged to act through said apron to press the marginal portion of the upper upon the bottom face of the insole along the forepart and shank portions of the insole, and means for fastening said members in upper-holding positions, said members and apron, together with the fastening means, being portable with the last and shoe.

86. Means for holding shoe uppers in lasted position, comprising a flexible elastic apron adapted to be wrapped about the top and sides of an upper on a last, members arranged to act through said apron to press the marginal portion of the upper upon the bottom face of an insole on the last along the opposite sides of the insole, and means for connecting said members together to maintain them in upper-holding positions, said members and apron, together with the connecting means, being portable with the last and shoe.

87. In a machine for shaping uppers over lasts, a flexible apron arranged to extend over the top and sides of an upper on a last to conform the upper to the contour of the last, and a substantially inflexible member on said apron arranged to support the heel end of the last.

88. In a machine for shaping uppers over lasts, a flexible apron arranged to conform an upper to the contour of the opposite sides of a last, and a member fastened to said apron and arranged to support the top of the heel end of the last.

89. In a machine for shaping uppers over lasts, a flexible elastic apron arranged to extend over the top and sides of an upper on a last to conform the upper to the contour of the last, and a member of rigid material fastened to said apron and arranged to support the top of the heel end of the last.

90. In a machine for shaping uppers over lasts, a flexible elastic apron arranged to support a last presented bottom upward with an upper thereon and to conform the upper to the contour of the top and sides of the last, and a member supported by said apron and arranged to serve as a support for the top of the heel end of the last.

91. In a machine for shaping uppers over lasts, a flexible elastic apron arranged to extend over the top and sides of an upper on a last to conform the upper to the contour of the last, and a member of rigid material arranged to support the top of the heel end of the last, the apron embracing said member and being fastened to the opposite sides thereof.

92. In a machine for shaping uppers over lasts, a flexible apron arranged to extend over the top and sides of an upper on a last to conform the upper to the contour of the last, and a device on said apron for supporting the heel end of the last, said device including a spindle arranged to project into the spindle hole of the last.

93. In a machine for shaping uppers over lasts, a flexible elastic apron for conforming an upper to the contour of the opposite sides of a last, and a device fastened to said apron for supporting the heel end of the last, said device including a spindle arranged to project into the spindle hole of the last.

94. In a machine for shaping uppers over lasts, a flexible apron arranged to extend over the top and sides of an upper on a last to conform the upper to the contour of the last, and a device fastened to said apron for supporting the heel end of the last, said device comprising a member of substantially rigid material and a spindle movable thereon in directions lengthwise of the last and arranged to project into the spindle hole of the last.

95. In a machine for shaping uppers over lasts, a flexible elastic apron arranged to extend over the top and sides of an upper on a last to conform the upper to the contour of the last, a member fastened to said apron and arranged to support the top of the heel end of the last, and a slide movable on said member in directions lengthwise of the last and provided with a spindle arranged to project into the spindle hole of the last.

96. In a machine for shaping uppers over lasts, a flexible elastic apron arranged to support a last presented bottom upward with an upper thereon and to conform the upper to the contour of the top and sides of the last, a member of rigid material supported by said apron, a slide mounted on said member for movements lengthwise of the last, and a spindle carried by said slide and arranged to project into the spindle hole of the last.

97. In a machine for shaping uppers over lasts, a flexible elastic apron arranged to receive a last presented bottom upward with an upper and an insole thereon, members connected to the opposite sides of said apron for supporting it, a device fastened to said apron for supporting the heel-end portion of the last, and means for depressing the last to cause the apron to conform the upper to the contour of the last.

98. In a machine for shaping uppers over lasts, a flexible elastic apron for conforming an upper to the contour of a last, said apron being arranged to extend across the top of the heel end of the last, and yieldable means for supporting the heel end of the last through said apron.

99. In a machine for shaping uppers over lasts, a flexible elastic apron for conforming an upper to the contour of a last, said apron being arranged to extend across the top of the heel end of the last, means for depressing the last to stretch said apron, and a spring-controlled plunger opposite the top face of the heel end of the last and movable by the depression of the last.

100. In a machine for shaping uppers over lasts, a flexible elastic apron for conforming an upper to the top and sides of a last between its toe and heel end portions, a member connected to said apron and arranged to support the top of the heel end of the last, and yieldable means separate from said member and apron for supporting said member in the upper-shaping operation.

101. In a machine for shaping uppers over lasts, a flexible elastic apron for conforming an upper to the top and sides of a last between its toe and heel end portions, a member connected to said apron and arranged to support the top of the heel end of the last, means for depressing the last and said member to stretch the apron, and a spring-controlled plunger depressible by the action of said member thereon.

102. In a machine for shaping uppers over lasts, a flexible elastic lasting device arranged to support a last with an upper thereon, means for moving the last heightwise by pressure applied over its bottom face to cause said device to shape the upper over the last, and mechanism for holding the last against lateral tipping movement in the upper-shaping operation.

103. In a machine for shaping uppers over lasts, a flexible elastic lasting device for shaping an upper over a last, a member mounted on said lasting device for supporting the heel end of the last, and mechanism arranged to act through said member to prevent lateral tipping movement of the last in the upper-shaping operation.

104. In a machine for shaping uppers over lasts, a flexible elastic apron arranged to extend over the top and sides of a last to conform the upper to the contour of the last, a device mounted on said apron for supporting the heel end of the last, said device including a spindle arranged to project into the spindle hole of the last, and mechanism arranged to act on said device to prevent lateral tipping of the last in the upper-shaping operation.

105. In a machine for shaping uppers over lasts, a flexible elastic apron arranged to extend over the top and sides of an upper on a last to conform the upper to the contour of the last, a member fastened to said apron for supporting the top of the heel end of the last, a spindle carried by said member for engaging the last in its spindle hole, and mechanism arranged to clamp said member on its opposite sides to prevent lateral tipping of the last in the upper-shaping operation.

106. In a machine for shaping uppers over lasts, a flexible elastic apron arranged to extend over the top and sides of an upper on a last to conform the upper to the contour of the last, a device fastened to said apron for supporting the top of the heel end of the last, means for applying pressure over the bottom of the last to move the last and said supporting device to stretch the apron, and mechanism for clamping said device on its opposite sides in response to the movement of the last to prevent lateral tipping of the last in the upper-shaping operation.

107. In a machine for shaping uppers over lasts, a flexible elastic apron arranged to extend over the top and sides of an upper on a last to conform the upper to the contour of the last, a device fastened to said apron for supporting the top of the heel end of the last, means for applying pressure over the bottom of the last to move the last and said supporting device to stretch the apron, members arranged to clamp said supporting device on its opposite sides to prevent lateral tipping of the last, and mechanism for operating said clamp members by the movement of the last.

108. In a machine for shaping uppers over lasts, a flexible elastic apron for conforming an upper to the top and sides of a last, a member fastened to said apron for supporting the top of the heel end of the last, means for depressing the last and said member to stretch the apron, a spring-controlled plunger depressible by the action of said member thereon, and mechanism carried by said plunger for clamping said member at its opposite sides to prevent lateral tipping of the last.

109. In a machine for shaping uppers over lasts, flexible means for engaging an upper frictionally at its opposite sides forwardly of its heel-end portion to work it heightwise of a last, said means being arranged to overlap the sides of the heel-end portion of the upper, and mechanism between said flexible means and the last for clamping the opposite sides of the heel end of the upper against the last.

110. In a machine for shaping uppers over lasts, a flexible elastic apron for working the opposite sides of an upper heightwise of a last forwardly of its heel-end portion, said apron being arranged to overlap the sides of the heel-end portion of the upper, and devices between said apron and the last for clamping the opposite sides of the heel end of the upper against the last.

111. In a machine for shaping uppers over lasts, a flexible elastic apron for working an upper heightwise of a last forwardly of its heel-end portion, a device fastened to said apron for supporting the top of the heel end of the last, and means mounted on said supporting device for clamping the opposite sides of the heel end of the upper against the last.

112. In a machine for shaping uppers over lasts, a flexible elastic apron for working the opposite sides of an upper heightwise of a last between its forepart and its heel-end portion, means for depressing the last relatively to said apron to stretch the apron, a support for the heel end of the last fastened to the apron and depressible with the last, and means carried by said support for clamping the opposite sides of the heel end of the upper against the last.

113. In a machine for shaping uppers over lasts, flexible means for engaging an upper frictionally at its opposite sides forwardly of its heel-end portion to work it heightwise of a last, said flexible means being arranged to overlap the sides of the heel-end portion of the upper, and mechanism arranged to act through said flexible means to clamp the opposite sides of the heel end of the upper against the last.

114. In a machine for shaping uppers over lasts, a flexible elastic apron for working the opposite sides of an upper heightwise of a last forwardly of its heel-end portion, said apron being arranged to overlap the sides of the heel-end portion of the upper, and means arranged to act through said apron to clamp the opposite sides of the heel end of the upper against the last.

115. In a machine for shaping uppers over lasts, a flexible elastic apron for working the opposite sides of an upper heightwise of a last forwardly of its heel-end portion, said apron being arranged to overlap the sides of the heel-end portion of the upper, members connected to said apron at the opposite sides of the last and movable inwardly toward the last to lay the marginal portion of the upper over the bottom of the last, and devices movable inwardly toward the last with said members and arranged to act through said apron to clamp the opposite sides of the heel end of the upper against the last.

116. In a machine for shaping uppers over lasts, a flexible elastic apron for working the opposite sides of an upper heightwise of a last between its forepart and its heel-end portion, said apron being arranged to overlap the sides of the heel-end portion of the upper, means for depressing the last relatively to said apron, a support for the heel end of the last depressible therewith, and devices carried by said support and arranged to act through said apron to clamp the opposite sides of the heel end of the upper against the last.

117. In a machine for shaping uppers over lasts, flexible means for working an upper heightwise of a last forwardly of its heel-end portion, said means being arranged to overlap the sides of the heel-end portion of the upper, devices between said flexible means and the last for clamping the opposite sides of the heel end of the upper against the last, and mechanism arranged to act through said flexible means to press said devices against the upper.

118. In a machine for shaping uppers over lasts, a flexible elastic apron for working the opposite sides of an upper heightwise of a last forwardly of its heel-end portion, said apron being arranged to overlap the sides of the heel-end portion of the upper, mechanism between said apron and the last for clamping the opposite sides of the heel end of the upper against the last, and means arranged to act through said apron to press said clamping mechanism against the upper.

119. In a machine for shaping uppers over lasts, a flexible elastic apron for working the opposite sides of an upper heightwise of a last forwardly of its heel-end portion, said apron being arranged to overlap the sides of the heel-end portion of the upper, resilient clamping devices between said apron and the last for clamping the opposite sides of the heel end of the upper against the last, and members movable inwardly toward the last and arranged to act through said apron to press said clamping devices inwardly against the upper.

120. In a machine for shaping uppers over lasts, a flexible elastic apron for working the opposite sides of an upper heightwise of a last forwardly of its heel-end portion, said apron being arranged to overlap the sides of the heel-end portion of the upper, means between said apron and the last for clamping the opposite sides of the heel end of the upper against the last, and rolls arranged to act through the apron to press said clamping means against the upper, said rolls being rotatable by the action of the apron thereon in the upper-shaping operation.

CHARLES F. PYM.